United States Patent

Inoue et al.

[11] Patent Number: 6,009,050
[45] Date of Patent: Dec. 28, 1999

[54] READING METHOD FOR MAGNETO-OPTICAL RECORDING DISC, MAGNETO-OPTICAL RECORDING DISC DRIVING DEVICE AND MAGNETO-OPTICAL RECORDING MEDIUM

[75] Inventors: Hiroyasu Inoue; Shinji Miyazaki; Jiro Yoshinari, all of Nagano, Japan

[73] Assignee: TDK Corporation, Tokyo, Japan

[21] Appl. No.: 09/084,381

[22] Filed: May 27, 1998

[30] Foreign Application Priority Data

Jun. 6, 1997 [JP] Japan .................................. 9-164991

[51] Int. Cl.$^6$ ...................................... G11B 11/00
[52] U.S. Cl. ................................. 369/13; 369/14
[58] Field of Search ................................. 369/13, 14, 110, 369/116; 360/114, 59; 365/122

[56] References Cited

U.S. PATENT DOCUMENTS

| | | | |
|---|---|---|---|
| 4,837,758 | 6/1989 | Motoyama et al. | 369/13 |
| 5,202,863 | 4/1993 | Miyatake et al. | 369/13 |
| 5,313,444 | 5/1994 | Ishii et al. | 369/13 |
| 5,434,831 | 7/1995 | Ishii et al. | 369/13 |
| 5,444,678 | 8/1995 | Ogata | 369/13 |

*Primary Examiner*—Tan Dinh
*Attorney, Agent, or Firm*—Laubscher & Laubscher; R. J. Lasker

[57] ABSTRACT

The invention provides a method which can be performed on the same device with application of a modulated magnetic field to read a magneto-optical recording disk through a series of processes involving "copy of recorded magnetic domains→enlargement of copied magnetic domains→reproduction of copied magnetic domains→size reduction and disappearance of copied magnetic domains", and to read an ordinary magneto-optical recording medium. For reading information recorded on the first magneto-optical recording disk, the first magneto-optical recording disk is irradiated with a laser beam having a first reading power, and the alternating magnetic field is then applied thereto after synchronization by which the alternating magnetic field is applied thereto at a recorded mark position. For reading information recorded on the second magneto-optical recording disk, the second magneto-optical recording disk is irradiated with a second laser beam.

18 Claims, 2 Drawing Sheets

READING METHOD FOR MAGNETO-OPTICAL RECORDING DISC, MAGNETO-OPTICAL RECORDING DISC DRIVING DEVICE AND MAGNETO-OPTICAL RECORDING MEDIUM

BACKGROUND OF THE INVENTION

The present invention relates to a reproduction method for magneto-optical recording disks, a magneto-optical recording disk driving device, and a magneto-optical recording disk.

In a magneto-optical recording disk, a magnetic thin film thereof is locally heated by laser beam irradiation or other light irradiation to decrease its coercive force. Then, an external magnetic field is applied to the magnetic thin film to invert the direction of magnetization of the irradiated spots or maintain the initial magnetization direction, thereby forming magnetic domains (recorded marks). The direction of magnetization of the magnetic domains is read out by the Kerr or Faraday effect.

In an ordinary magneto-optical recording disk, the available density of reproducible magnetic domains is limited by the spot diameter of the laser beam used for reading, and so it is impossible to read magnetic domains having a diameter smaller than the half of the laser beam spot diameter.

For a magneto-optical recording medium capable of reading magnetic domains having a diameter smaller than the half of laser beam spot diameter, for instance, JP-A 8-7350 discloses a magneto-optical recording medium capable of enlarging recorded magnetic domains. This magneto-optical recording medium comprises a three-layered recording film comprising, in order from an substrate side, a first magnetic layer, a second magnetic layer, and a third magnetic layer which are exchange coupled together. Upon reading, the substrate of the medium is irradiated with a laser beam while a reading magnetic field is applied to the recording film of the medium. The third magnetic layer holds recorded magnetic domains, which are copied by laser beam irradiation to the first, and second magnetic layers. The copied magnetic domains are enlarged by the application of a reading magnetic field in the longitudinal direction of each magnetic layer. The enlarged, copied magnetic domains are read out as is the case with a conventional magneto-optical recording medium. After the reading of the enlarged, copied magnetic domains has finished, an erasing magnetic field opposite in direction to the reading magnetic field is applied to erase off the copied magnetic domains for the next reading of adjacent recorded magnetic domains. By repetition of such a process, it is possible to read minute magnetic domains unreadable so far in the art. Furthermore, this method does not only achieve high resolution upon reading, but also enables output signal strength to be in itself augmented because the magnetic domains are actually enlarged. Hereinafter, the magneto-optical recording medium using such a process for reading will be called a magneto-optical recording medium of the domain enlargement reading type.

For reading the magneto-optical recording medium of the domain enlargement reading type, it is thus required to apply thereto an alternating magnetic field comprising a read bias magnetic field and an erase bias magnetic field.

However, when a modulated magnetic field is applied on an ordinary magneto-optical recording disk for reading purposes, magnetic domains recorded thereon are often erased off. Never until now is it attempted to run an ordinary magneto-optical recording disk and a magneto-optical recording disk of the domain enlargement reading type on the same driving device for reading purposes.

SUMMARY OF THE INVENTION

One object of the present invention is to provide a reading method for a magneto-optical recording disk comprising a magnetic layer of a multilayer structure, which method comprises a reading mode capable of reading said magneto-optical recording disk through a series of processes involving "copy of recorded magnetic domains→enlargement of copied magnetic domains→reproduction of copied magnetic domains→size reduction and disappearance of copied magnetic domains" upon application of a modulated magnetic field thereto, and a reading mode capable of reproduction an ordinary magneto-optical recording medium with no application of a modulated magnetic field, a driving device for said magneto-optical recording disk, and a magneto-optical recording disk run on said driving device.

The aforesaid object is achieved by the embodiments of the invention defined below as (1) to (16).

(1) A reproduction method for a plurality of magneto-optical recording disks comprising a first magneto-optical recording disk in which information recorded thereon is read by applying an alternating magnetic field thereto while said first magneto-optical recording disk is irradiated with a laser beam and a second magneto-optical recording disk in which information recorded thereon is read by laser beam irradiation with no application of said alternating magnetic field thereto, said first and second magneto-optical recording disks being run on the same magneto-optical recording disk driving device for reproduction, wherein:

for reproduction said information on said first magneto-optical recording disk, said first magneto-optical recording disk is irradiated with a laser beam having a first reproduction power, and said alternating magnetic field is applied to said first magneto-optical recording disk after synchronization by which a read bias magnetic field of said alternating magnetic field is applied thereto at a recorded mark position, and for reproduction said information on said second magneto-optical recording disk, said second magneto-optical recording disk is irradiated with a laser beam having a second reproduction power.

(2) The reproduction method according to (1), wherein after loading of said magneto-optical recording disks on said magneto-optical recording disk driving device, said magneto-optical recording disk driving device reads magneto-optical recording disk identifying information to thereby make a discrimination between said first magneto-optical recording disk and said second magneto-optical recording disk.

(3) The reproduction method according to (1), wherein said synchronization is effected by reproduction a pre-pit formed in disk bodies of said magneto-optical recording disks, and synchronizing turning-on of said magnetic field with a clock signal rise.

(4) The reproduction method according to (1), wherein said first magneto-optical recording disk comprises a plurality of magnetic layers with said information recorded in a magnetic layer farthest away from a surface of said first magneto-optical recording disk to be irradiated with said laser beam, and wherein a recorded magnetic domain in a recorded mark is copied by said laser beam irradiation and said application of said read bias magnetic field to a magnetic layer nearest to said surface of said first magneto-optical recording disk where said recorded magnetic domain is enlarged, and said copied magnetic domain upon enlargement is read by said laser beam, followed by application of an erase bias magnetic field of said alternating magnetic field in an opposite direction, thereby erasing off said copied magnetic domain.

(5) The reproduction method according to (1), wherein a pulse width of said alternating magnetic field is a half of a clock signal.

(6) The reproduction method according to (1), wherein revolutions per minute are altered and/or a pickup changeover is made prior to said reproduction light irradiation.

(7) The reproduction method according to (1), wherein said first reproduction power is larger than said second reproduction power, and said reproduction powers are altered.

(8) A magneto-optical recording disk driving device, wherein a changeover can be made between a first reproduction mode where an alternating magnetic field is applied to a magneto-optical recording disk while said magneto-optical recording disk is irradiated with a laser beam, thereby reproduction information recorded thereon and a second reproduction mode where said information is read with no application of said alternating magnetic field.

(9) The magneto-optical recording disk driving device according to (8), wherein said changeover between said first reproduction mode and said second reproduction mode can occur automatically based on disk identifying information carried on said magneto-optical recording disk.

(10) The magneto-optical recording disk driving device according to (8), which is used for the reproduction method according to (1).

(11) A magneto-optical recording disk which is run on the magneto-optical recording disk driving device according to (8) for reproduction, which comprises a disk body and a cartridge for containing said disk body therein, with said disk identifying information carried on said cartridge.

(12) The magneto-optical recording disk according to (11), to which an alternating magnetic field is applied while said magneto-optical recording disk is irradiated with a laser beam, thereby reproduction information recorded thereon.

(13) A magneto-optical recording disk which is run on the magneto-optical recording disk driving device according to (8) for reproduction, which comprises a disk and a cartridge for containing said disk therein, with said disk identifying information carried on said disk.

(14) The magneto-optical recording disk according to (13), to which an alternating magnetic field is applied while said magneto-optical recording disk is irradiated with a laser beam, thereby reproduction information recorded thereon.

(15) The magneto-optical recording disk according to (13), wherein said disk identifying information is carried in a pre-pit formed in said disk.

(16) The magneto-optical recording disk according to (15), to which an alternating magnetic field is applied while said magneto-optical recording disk is irradiated with a laser beam, thereby reproduction information recorded thereon.

EXPLANATION OF THE PREFERRED EMBODIMENTS

The driving device according to the invention comprises a first reproduction mode and a second reproduction mode which can be changed from one over to another.

The first reading mode is applied to a magneto-optical recording medium of the domain enlargement reproduction type. While the magneto-optical recording medium is irradiated with a laser beam, an alternating magnetic field is applied thereto. The second reading mode is applied to an ordinary magneto-optical recording disk. The magneto-optical recording disk is merely irradiated with a laser beam with no application of the modulated magnetic field.

Preferably, a reading mode changeover occurs automatically on the basis of disk identifying information carried on the magneto-optical recording disk. However, it is acceptable to make a free reading mode changeover as by the switching operation of a switch provided on the driving device. It is also acceptable to make a selection between the automatic changeover and the free changeover.

Figure 1:
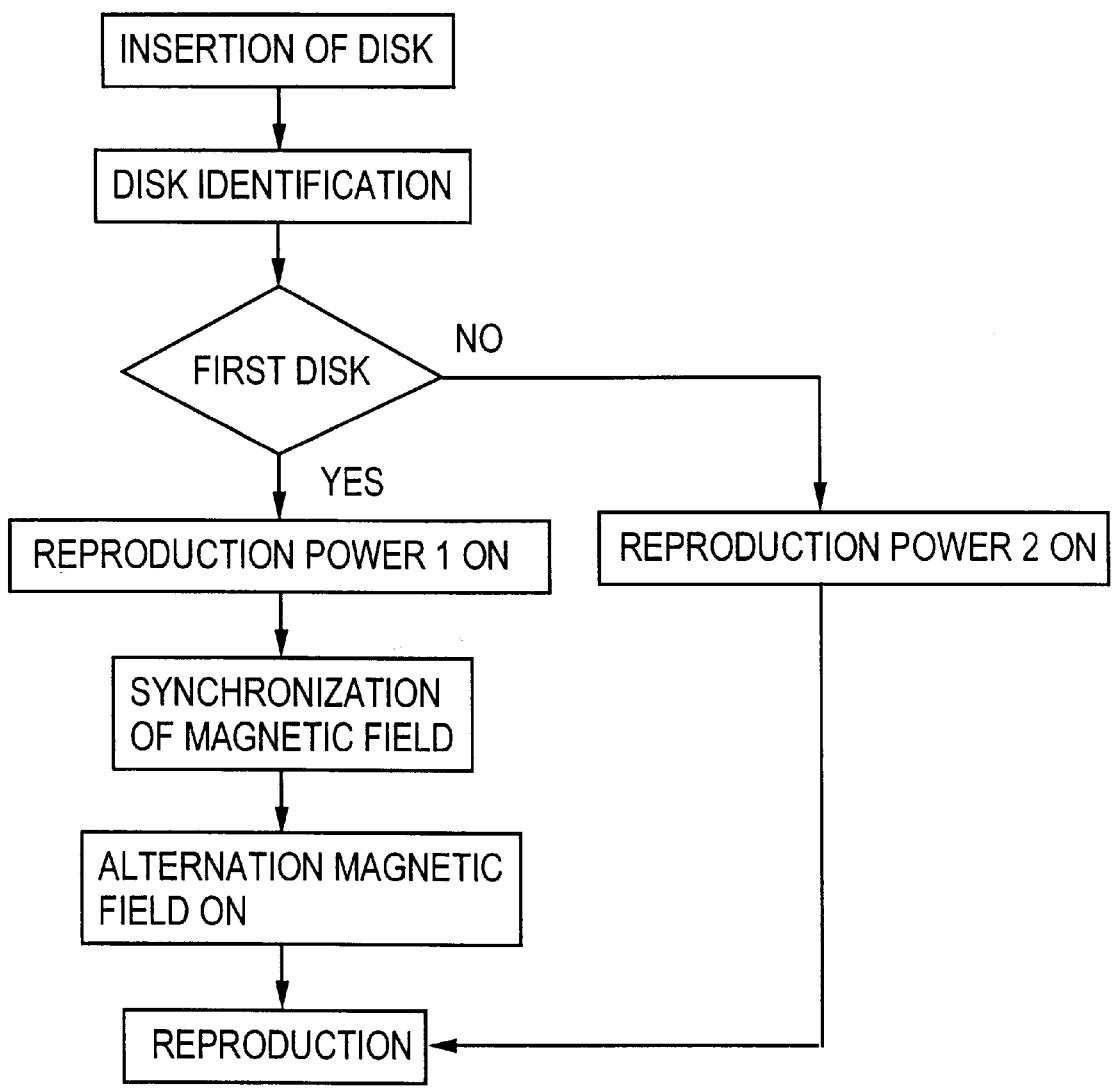
FIG. 1 is a flowchart illustrative of the reproduction method according to the invention.

The reading method is explained with reference to the flowchart of FIG. 1. First, the disk is inserted into the device. Then, whether the disk is the first or the second disk is identified. For instance, this identification is made by reading a pre-pit or a detection hole in a cartridge.

When the disk is identified as the first disk, first reading light is powered up. At this time, the reading light reads the pre-pit to synchronize a recorded mark with turning-on of a read bias magnetic field of the alternating magnetic field and turning-off of the read bias magnetic field, i.e., turning-on of an erase bias magnetic field. More specifically, it is preferable that the turning-on of the magnetic field is synchronized with a clock signal rise.

Figure 2:
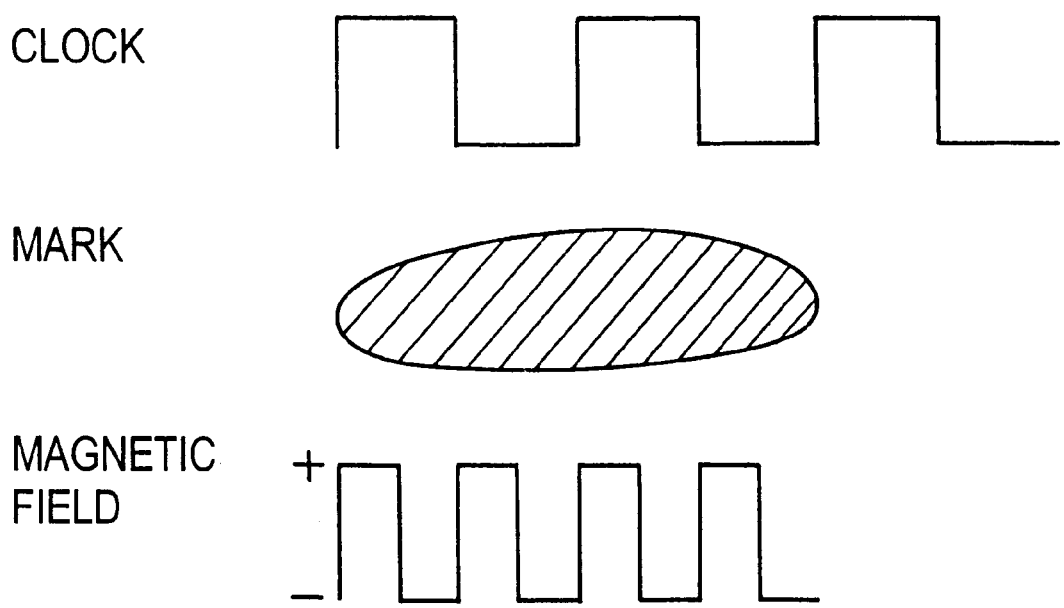
FIG. 2 is a timing chart illustrative of the reproduction method according to the invention.

Pulse width of the modulated magnetic field is shorter than the recorded mark, and the pulse width thereof is a half of the clock signal, as shown in FIG. 2. The read bias magnetic field is about 50 to 300 Oe, and the erase bias magnetic field is about 50 to 300 Oe. Thereafter, reading is carried out by the application of the reading light and alternating magnetic field. The intensity of the first reading light is about 0.5 to 5.0 mW.

When the disk is identified as the second disk, second reading light is powered up for reading. The intensity of the reading light is about 0.3 to 1.5 mW; that is, the second reading light is smaller in power than the first reading light. For this reason, the power is altered just to powering-up.

It is to be noted that when a selection is manually made from the reading modes, no disk identification is needed. It is also to be noted that prior to powering-up, the reading power may be changed optionally with changes in the revolutions per minute, pickup, etc.

In the driving device of the invention, usually, not only the reading mode changeover but also a recording mode changeover can be made depending upon the type of the medium. The magneto-optical recording disk of the domain enlargement reading type achieves a higher recording density than does an ordinary magneto-optical recording disk, and is generally different from the ordinary magneto-optical recording disk in terms of the magnetic properties of the recording layers, the optimum output of recording laser beams, etc. In other words, each magneto-optical recording disk of that type has its own recording mode. It is thus preferred that the recording mode changeover, too, can be automatically or optionally made as in the case of the aforesaid reading mode.

Simultaneously with the recording and reading mode changeovers, it is acceptable to make changeovers in other parameters like the light source, lens, and optical pickup used, linear velocity (revolutions per minute), etc.

How to carry the disk identifying information on the magneto-optical recording disk is not particularly critical to the practice of the invention. For instance, when the magneto-optical recording disk is a magneto-optical recording disk contained in a cartridge, it is possible to carry the disk identifying information on the cartridge. Preferably but not exclusively, a detection hole—which is not usually provided in an ordinary magneto-optical recording disk cartridge—is formed in a cartridge for the magneto-optical recording disk of the domain enlargement reading type. Then, whether or not the detection hole is present is optically or mechanically found for the reading or recording mode changeover.

The medium identifying information, for instance, in a pre-pit form, may be carried on the disk per se rather than on the cartridge. Preferably in this case, the pre-pit for carrying the aforesaid disk identifying information thereon is formed in an area where ROM information such as recording power is carried by means of a pre-pit. This is because upon loading of the disk on the driving device, the pre-pit area is first read to ensure that the reading mode changeover is effected.

The driving device according to the invention is applicable to a magneto-optical recording disk of the domain enlargement reading type such as one disclosed in the aforesaid JP-A 8-7350. The present invention is also applicable to a magneto-optical recording disk proposed in U.S. Ser. No. 09/055,874 filed on Apr. 7, 1998.

ACTIONS AND EFFECTS

The driving device of the invention is run with a magneto-optical recording medium of the domain enlargement reading type, and the aforesaid domain enlargement reading is carried out by the application of an alternating magnetic field thereto during reading. When the driving device of the invention is run with an ordinary magneto-optical recording medium, on the other hand, ordinary reading is carried out as is the case with a conventional driving device while no alternating magnetic field is applied thereto during reading.

A manual changeover may be made between the first reading mode for reading a magneto-optical recording medium of the domain enlargement reading type and the second reading mode for reading an ordinary magneto-optical recording medium, as desired. However, if identification information carried on the disk is detected by a detector means provided on the driving device side to make a forced changeover between the reading modes, it is then possible to prevent any accidental erasure of information recorded on the ordinary magneto-optical recording disk.

What is claimed is:

1. A reading method for a plurality of magneto-optical recording disks comprising a first magneto-optical recording disk in which information recorded on said disk is read by applying an alternating magnetic field to said disk while said first magneto-optical recording disk is irradiated with a laser beam and a second magneto-optical recording disk in which information recorded on said disk is read by laser beam irradiation with no application of said alternating magnetic field, said first and second magneto-optical recording disks being run on the same magneto-optical recording disk driving device for reading purposes, wherein:

for reading said information on said first magneto-optical recording disk, said first magneto-optical recording disk is irradiated with a laser beam having a first reading power, and said alternating magnetic field is applied to said first magneto-optical recording disk after synchronization by which a read bias magnetic field of said alternating magnetic field is applied to said disk at a record mark position, and for reading said information on said second magneto-optical recording disk, said second magneto-optical recording disk is irradiated with a laser beam having a second reading power.

2. The reading method according to claim 1, wherein after loading of said magneto-optical recording disks on said magneto-optical recording disk driving device, said magneto-optical recording disk driving device reads magneto-optical recording disk-identifying information to between said first magneto-optical recording disk and said second magneto-optical recording disk.

3. The reading method according to claim 1, wherein said synchronization is effected by reading a pre-pit formed in disk bodies of said magneto-optical recording disks, and synchronizing turning-on of said magnetic field with a clock signal rise.

4. The reading method according to claim 1, wherein said first magneto-optical recording disk comprises a plurality of magnetic layers with said information recorded in a magnetic layer farthest away from a surface of said first magneto-optical recording disk to be irradiated with said laser beam, and wherein a recorded magnetic domain in a recorded mark is copied by said laser beam irradiation and said application of said read bias magnetic field to a magnetic layer nearest to said surface of said first magneto-optical recording disk where said recorded magnetic domain is enlarged, and said copied magnetic domain upon enlargement is read by said laser beam, followed by application of an erase bias magnetic field of said alternating magnetic field in an opposite direction, and erasing said copied magnetic domain.

5. The reading method according to claim 1, wherein a pulse width of said alternating magnetic field is a half of a clock signal.

6. The reading method according to claim 1, wherein revolutions per minute are altered and a pickup changeover is made prior to said reading light irradiation.

7. The reading method according to claim 1, wherein said first reading power is larger than said second reading power, and said read powers are altered.

8. A magneto-optical recording disk driving device, wherein a changeover is made between a first reading mode where an alternating magnetic field is applied to a magneto-optical recording disk while said magneto-optical recording disk is irradiated with a laser beam for reading information recorded on said disk and a second reading mode where said information is read with no application of said alternating magnetic field.

9. The magneto-optical recording disk driving device according to claim 8, wherein said changeover between said first reading mode and said second reading mode can occurs automatically based on disk identifying information carried on said magneto-optical recording disk.

10. The magneto-optical recording disk driving device according to claim 8, which is used for the reading method according to claim 1.

11. A magneto-optical recording disk which is run on the magneto-optical recording disk driving device according to claim 8 for reading, which comprises a disk body and a cartridge for containing said disk body, with said disk identifying information carried on said cartridge.

12. The magneto-optical recording disk according to claim 11, to which an alternating magnetic field is applied while said magneto-optical recording disk is irradiated with a laser beam for reading information recorded on said disk.

13. A magneto-optical recording disk which is run on the magneto-optical recording disk driving device according to claim 8 for reading, which comprises a disk and a cartridge for containing said disk, with said disk identifying information carried on said disk.

14. The magneto-optical recording disk according to claim 13, to which an alternating magnetic field is applied while said magneto-optical recording disk is irradiated with a laser beam, for reading information recorded thereon.

15. The magneto-optical recording disk according to claim 13, wherein said disk identifying information is carried in a pre-pit formed in said disk.

16. The magneto-optical recording disk according to claim 15, to which an alternating magnetic field is applied while said magneto-optical recording disk is irradiated with a laser beam for reading information recorded on said disk.

17. The reading method according to claim 1, wherein a pickup changeover is made prior to said reading light irradiation.

18. The reading method according to claim 1, wherein revolutions per minute are altered prior to said reading light irradiation.

* * * * *

UNITED STATES PATENT AND TRADEMARK OFFICE
CERTIFICATE OF CORRECTION

PATENT NO. : 6,009,050
DATED : December 28, 1999
INVENTOR(S) : Hiroyasu Inoue et al.

It is certified that error appears in the above-identified patent and that said Letters Patent is hereby corrected as shown below:

Column 7, line 18, delete "can"

Column 8, line 14, delete ","

Signed and Sealed this

Eighth Day of August, 2000

Attest:

Q. TODD DICKINSON

*Attesting Officer*  *Director of Patents and Trademarks*